(12) United States Patent
Kambara et al.

(10) Patent No.: US 8,024,601 B2
(45) Date of Patent: *Sep. 20, 2011

(54) RESTARTING METHOD USING A SNAPSHOT

(75) Inventors: Yasuyuki Kambara, Yokohama (JP);
Yoshifumi Takamoto, Kokubunji (JP);
Keisuke Hatasaki, Kawasaki (JP);
Kouji Masuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/633,962

(22) Filed: Dec. 9, 2009

(65) Prior Publication Data
US 2010/0088543 A1 Apr. 8, 2010

Related U.S. Application Data

(63) Continuation of application No. 11/494,367, filed on Jul. 26, 2006, now Pat. No. 7,644,302.

(30) Foreign Application Priority Data

Jan. 4, 2006 (JP) .................................. 2006-000027

(51) Int. Cl.
*G06F 11/00* (2006.01)
(52) U.S. Cl. ........ 714/4.12; 714/4.1; 714/4.11; 714/6.3; 714/6.31; 714/6.32; 714/20
(58) Field of Classification Search .................... 714/13, 714/20, 4, 6, 4.1, 4.11, 4.12, 6.3
See application file for complete search history.

(56) References Cited

U.S. PATENT DOCUMENTS

| 5,696,895 | A | 12/1997 | Hemphill et al. |
| 5,812,751 | A | 9/1998 | Ekrot et al. |
| 5,930,823 | A | 7/1999 | Ito et al. |
| 6,161,193 | A * | 12/2000 | Garg et al. ........................ 714/6 |
| 6,167,531 | A | 12/2000 | Sliwinski |
| 6,460,144 | B1 | 10/2002 | Ashcroft et al. |
| 6,694,447 | B1 | 2/2004 | Leach et al. |
| 6,804,703 | B1 | 10/2004 | Allen et al. |
| 6,874,035 | B1 | 3/2005 | Andre et al. |
| 6,944,788 | B2 | 9/2005 | Dinker et al. |

(Continued)

FOREIGN PATENT DOCUMENTS
JP 2000-16327 A 6/2000
(Continued)

OTHER PUBLICATIONS

Japan Patent Office (JPO) office action for JPO patent application JP2006-000027 (Dec. 7, 2010).

*Primary Examiner* — Robert W Beausoliel, Jr.
*Assistant Examiner* — Joshua P Lottich
(74) *Attorney, Agent, or Firm* — Kilpatrick Townsend & Stockton LLP

(57) ABSTRACT

The active server A101 notifies its own operating status to the administration server 106, and the administration server 106 acquires a snapshot and copies a disk according to the policy established by a user. When the active server A101 or the active disk 113 fails, the administration server 106 chooses a backup server A104 and a status storage disk A114 to be booted and restarts them by using the snapshot according to the policy.

18 Claims, 17 Drawing Sheets

U.S. PATENT DOCUMENTS

| | | | |
|---|---|---|---|
| 6,948,089 B2 | 9/2005 | Fujibayashi | |
| 6,957,221 B1 | 10/2005 | Hart et al. | |
| 6,983,295 B1 | 1/2006 | Hart | |
| 7,032,128 B2 | 4/2006 | Nakano | |
| 7,082,553 B1 | 7/2006 | Wang | |
| 7,103,713 B2 | 9/2006 | Saika et al. | |
| 7,107,485 B2 | 9/2006 | Baba et al. | |
| 7,117,393 B2 | 10/2006 | Baba et al. | |
| 7,136,977 B2 | 11/2006 | Obayashi et al. | |
| 7,181,646 B2 | 2/2007 | Kana | |
| 7,263,537 B1 | 8/2007 | Lin et al. | |
| 7,266,654 B2 | 9/2007 | Nakano et al. | |
| 7,287,186 B2 | 10/2007 | McCrory et al. | |
| 7,290,166 B2 | 10/2007 | Rothman et al. | |
| 7,325,159 B2 | 1/2008 | Stager et al. | |
| 7,330,996 B2 | 2/2008 | Coteus et al. | |
| 7,330,999 B2 | 2/2008 | Davies et al. | |
| 7,356,574 B2 | 4/2008 | Demmon | |
| 7,376,865 B2 | 5/2008 | Kano | |
| 7,418,624 B2 | 8/2008 | Ichikawa et al. | |
| 7,444,538 B2 | 10/2008 | Sciacca | |
| 7,457,982 B2 | 11/2008 | Rajan | |
| 7,461,293 B2 | 12/2008 | Ohno et al. | |
| 7,475,285 B2 | 1/2009 | Wang et al. | |
| 2002/0069369 A1 | 6/2002 | Tremain | |
| 2003/0188115 A1 | 10/2003 | Maezawa | |
| 2004/0167972 A1 | 8/2004 | Demmon | |
| 2004/0172577 A1 | 9/2004 | Tan et al. | |
| 2004/0205377 A1* | 10/2004 | Nakamura et al. | 714/4 |
| 2004/0205388 A1 | 10/2004 | Nakano | |
| 2005/0050392 A1 | 3/2005 | Baba et al. | |
| 2005/0060607 A1 | 3/2005 | Kano | |
| 2005/0198327 A1* | 9/2005 | Iwamura et al. | 709/229 |
| 2006/0026319 A1 | 2/2006 | Rothman et al. | |
| 2006/0053261 A1* | 3/2006 | Prahlad et al. | 711/162 |
| 2006/0168471 A1* | 7/2006 | Schulstad | 714/6 |
| 2007/0005665 A1 | 1/2007 | Vaitzblit et al. | |

FOREIGN PATENT DOCUMENTS

| | | | |
|---|---|---|---|
| JP | 2006-72405 A | 3/2006 | |

* cited by examiner

FIG.4
Policy Table

| Policy Identifier | Description of Policy | Acquisition of Snapshot | Automatic Switching to Backup Server | Disk to be Used |
|---|---|---|---|---|
| P1 | To be applied after the OS is booted | O | × | − |
| P2 | To be applied when a server is shut down | O | × | − |
| P3 | To be applied when an alert occurred | O | × | − |
| P4 | To be applied when a failure occurred | O | O | After the OS is booted |

FIG.5
Disk Management Table

| LU | Snapshot | Acquisition Source LU | Type | Generation | Acquisition Date |
|---|---|---|---|---|---|
| LU 1 | SS 1 | LU 0 | After the OS is booted | 1 | 2005/01/07_12:05:18 |
| LU 2 | SS 2 | LU 0 | To be acquired when a failure occurred | 1 | 2005/03/22_06:12:23 |
| LU 3 | SS 3 | LU 0 | To be acquired when a server is shut down | 1 | 2005/07/28_09:00:00 |
| LU 4 | SS 4 | LU 0 | To be acquired when an alert occurred | 1 | 2005/07/28_21:07:23 |
| LU 5 | SS 5 | LU 0 | To be acquired when a failure occurred | 2 | 2005/07/28_22:17:44 |

FIG.6
Server Management Table

| Server Identifier (601) | WWN (602) | LU (603) | Backup Server (604) | Operational Duration (605) | Operational Rate (606) | Introduction Date (607) |
|---|---|---|---|---|---|---|
| S1 | WWN 1 | LU 0 | S3 | 1200 | 99.0 | 2005/01/02 |
| S2 | WWN 2 | LU 10 | S4 | 360 | 98.0 | 2005/07/28 |
| S3 | WWN 3 | – | – | 150 | 99.0 | 2005/01/02 |
| S4 | WWN 4 | – | – | 40 | 97.0 | 2005/07/28 |

FIG.7
Alert Table

| Alert ID (701) | Alert Level (702) |
|---|---|
| 1000 | Information |
| 1001 | Caution |
| 1002 | Warning |
| 1003 | Failure |
| 2000 | OS startup |
| 2001 | Shutdown |

RESTARTING METHOD USING A SNAPSHOT

CROSS-REFERENCE TO RELATED APPLICATION(S)

This is a continuation of U.S. patent application Ser. No. 11/494,367, filed Jul. 26, 2006, which application claims priority from Japan Patent Application No. 2006-000027, filed Jan. 4, 2006, the content of which is hereby incorporated by reference into this application.

BACKGROUND OF THE INVENTION

The present invention relates to a failover method of a computing system including a server which is booted from an external disk device.

In general, a computing system such as a server is configured in such a manner that the OS (Operating System) installed in a built-in disk is booted and then business work is performed on the OS. Examples of methods for enhancing reliability of such a server include one method in which a backup server having the same a configuration is provided and the main server is switched over to the backup server when the main server fails. With this method, however, since it is not possible to take over data concerning the business work stored in the disk, it is necessary to execute the work processing in progress over again. Further, another method is to transfer data concerning work among a plurality of servers via a network and, to take over the whole data concerning the business work in case either one server fails. Use of such a method enables the backup server to continue work that is in progress. Although the former method has an advantage that it is applicable to all sorts of business program, it cannot take over business work. On the other hand, the latter method has an the advantage that can take over business work in progress, but it is required to arrange that a business application should have a mechanism that transfers business data to a backup server, which restricts application of the method to all business applications.

Examples of methods for solving the disadvantages of the above-described two methods for enhancing reliability include a method, as stated in U.S. Patent Application Publication Nos. 2005/0060607A1 and 2003/0188115A1, wherein booting of the OS is accelerated by booting the OS from a snapshot that is acquired. Here, the term "snapshot" means information including memory status where the OS or business program is in operation. By storing a snapshot in a disk or the like and by booting a server by using the snapshot, it is possible to resume the OS or the business program at high-speed. Thus, by using the snapshot and booting a server at high-speed when the server fails, it is possible to recover the server while ensuring the active status of the OS or the business program.

Although the above-stated conventional arts can recover the server along while ensuring the active status of the OS or the business program by booting the server by using a snapshot at a high speed when the server fails, the failover function does not work depending on a snapshot to be used. For example, when a server acquired a snapshot during a time period when the server is in failure, even if the server is recovered by using the snapshot and the OS or the business program is resumed, there will be a problem in reliability since the server is in failed and unstable memory status. Therefore, the fact in which status of a server a snapshot was acquired constitutes a very important issue and, to ensure failover function, a snapshot that is acquired under normal operating status becomes mandatory.

SUMMARY OF THE INVENTION

To solve the above-stated problems, a server notifies an administration server of its own operating status and the administration server executes acquisition of a snapshot and copying of a disk according to a policy established by a user. A plurality of copy destinations of a disk and a snapshot will be prepared in advance, and history of not only a snapshot in a status that a failure occurred, but also snapshots under various statuses such as a snapshot under normal status right after operation and a normal and latest snapshot existed right before occurrence of failure will be acquired.

Further, when switching is made from an active sever to a backup server due to a failed server or disk, the administration server choose a backup server, and a disk and a snap to be booted which are in correct status according to the policy, and boots them.

BRIEF DESCRIPTION OF THE DRAWINGS

Other objects and advantages of the invention will become apparent from the following description of embodiments with reference to the accompanying drawings in which:

FIG. 4 is a format diagram illustrating a policy table of the above-stated embodiment;

FIG. 5 is a format diagram illustrating a disk management table of the above-stated embodiment;

FIG. 6 is a format diagram illustrating a server management table of the above-stated embodiment;

FIG. 7 is a format diagram illustrating an alert table of the above-stated embodiment;

DETAILED DESCRIPTION OF PREFERRED EMBODIMENTS

Hereinafter, preferred embodiments of the present invention will be described in detail with reference to the accompanying drawings.

First Embodiment

Figure 1:
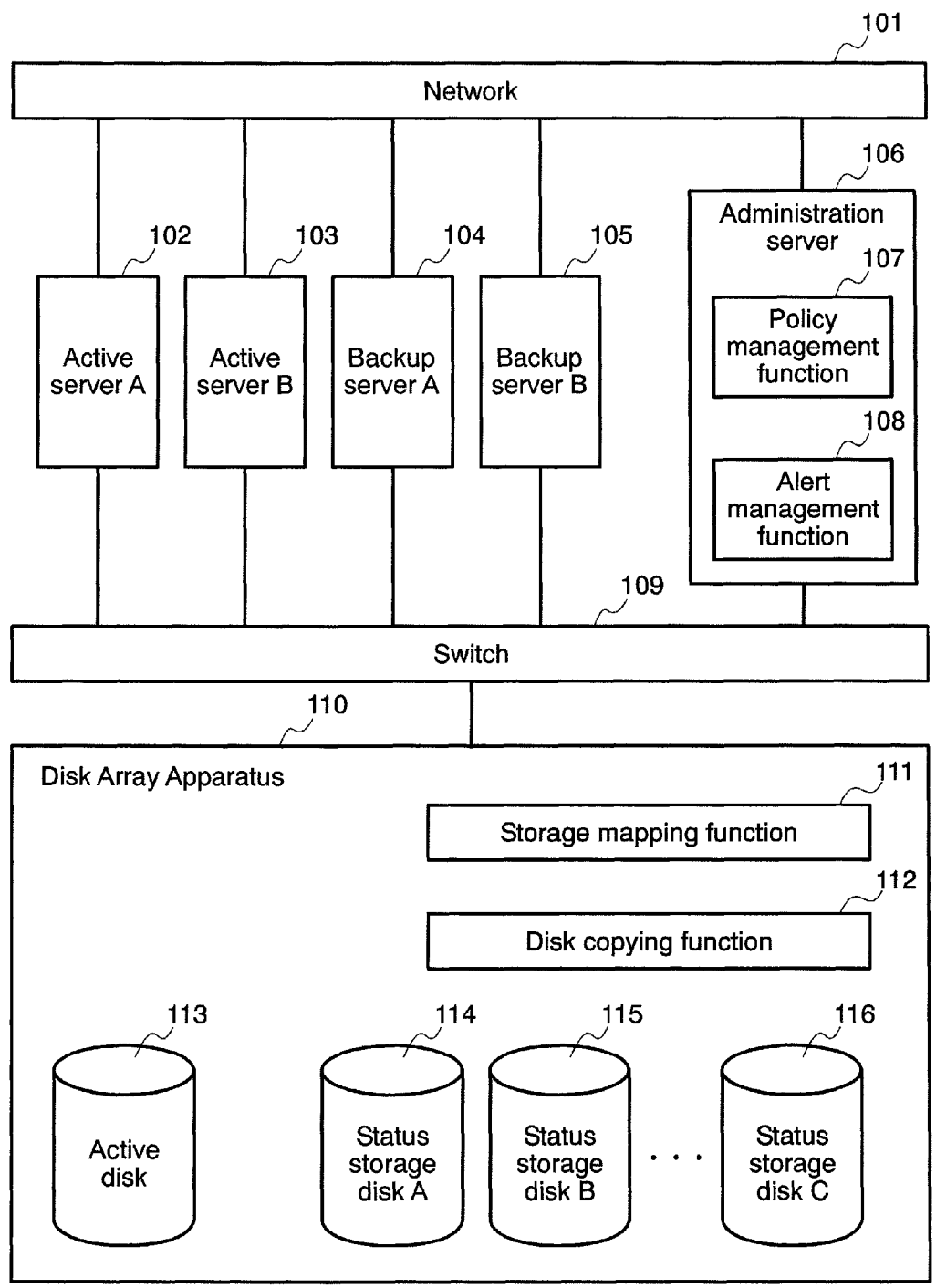
FIG. 1 is a block diagram illustrating the entire configuration of a first embodiment of the present invention.

FIG. 1 is a configuration example of the first embodiment according to the present invention. Referring to FIG. 1, active servers A102, B103, backup servers A104, B105 and an administration server 106 are connected to a network 101 and a switch 109. The switch 109 is connected to a disk array apparatus 110. An administration server 108 includes a policy management function 107 which operates in accordance with a policy defined by a user and an alert management function 180 which administrates an alert that is transmitted from the active server A102 or the active server B103. The disk array apparatus 110 includes a storage mapping function 111 which executes connection between servers and the disk array apparatus 110, and a disk copying function 112 which copies an active disk 113 on status storage disks A114, B115 and C116.

Here, the term "active server" means a server that is currently in operation for certain business work, and the term "backup server" means a server that is switched over to take over business work when the server in operation fails.

Figure 2:
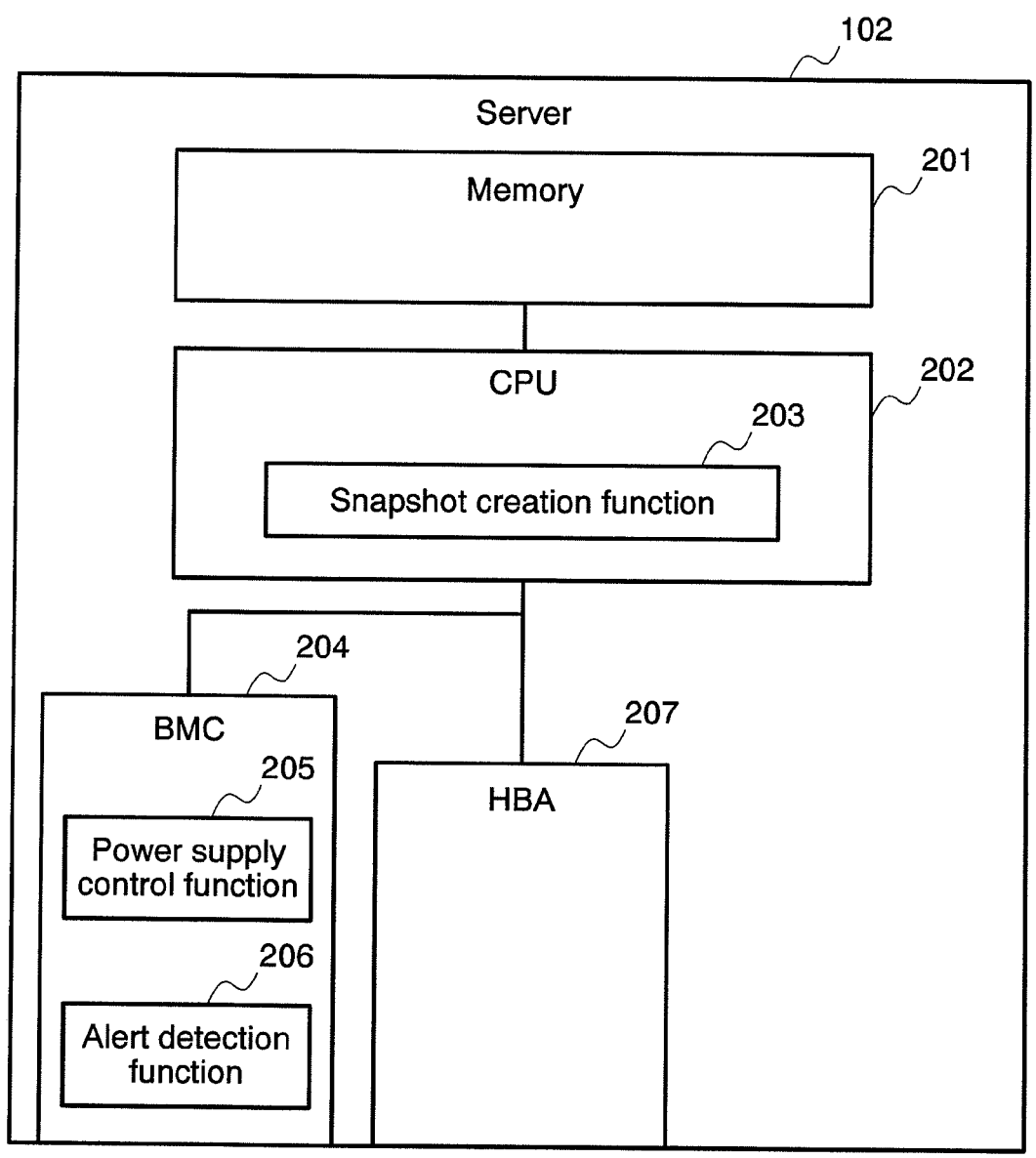
FIG. 2 is a block diagram illustrating a configuration of a server of the above-stated embodiment.

FIG. 2 is a block diagram of a server. A server 102 includes a memory 201; a CPU 202; a snapshot creation function 202 which creates a snapshot from the memory 201; a BMC 204 which includes a power supply control function 205 that controls power supply of the server 102 and an alert detection function 206 that detects and transmits an alert of the server 102, and which is connected to the network 101; and an HBA 207 which is connected to a switch 109. Here, the term "snapshot" means information containing status of the memory 201 while the server 102 is in operation and further means to back up information of a disk drive (LU), etc. in a specified timing. By reading the snapshot, it is possible to develop information of the memory 201 to the server 102, thus putting the server 102 in the status when the snapshot is acquired.

Figure 3:
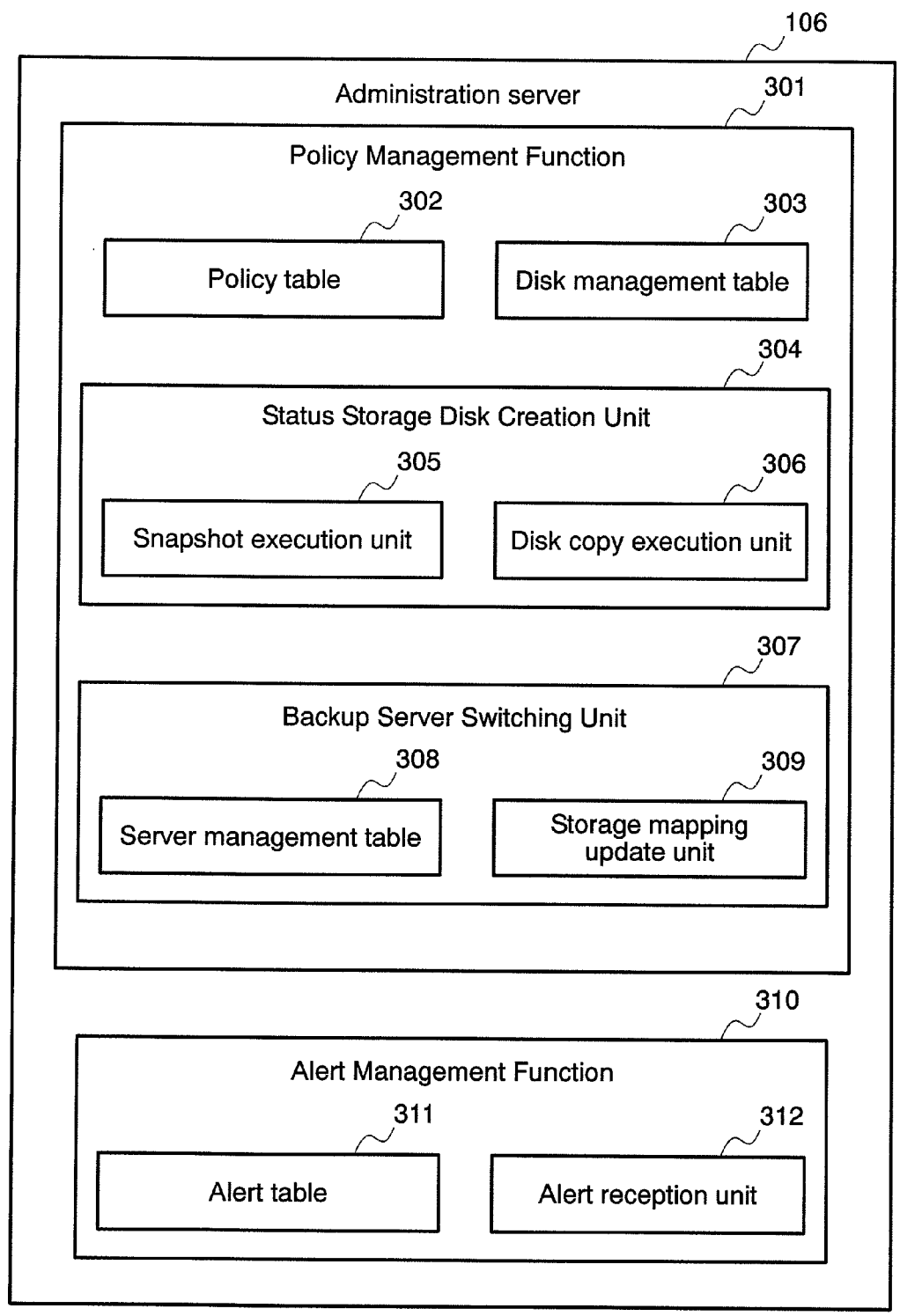
FIG. 3 is a functional block diagram illustrating a configuration of an administration server of the above-stated embodiment.

FIG. 3 is a block diagram of an administration server. An administration server 106 includes a policy management function 301 and an alert management function 310. The policy management function 301 includes a policy table 302 which manages policies defined by a user; a disk management table 303 which manages information of snapshots stored in the disk array apparatus 110; a status storage disk creation unit 304 which creates a status storage disk; and a backup server switching unit 307 which switches an active server to a backup server. The status storage disk creation unit 304 includes a snapshot execution unit 305 which requests the server 102 to create a snapshot and a disk copy execution unit 306 which requests the disk array apparatus 110 to copy a disk. The backup server switching unit 307 includes a server management table 308 which manages information of an active server or a backup server and a storage mapping update unit 309 which requests the disk array apparatus 110 to update storage mapping. The alert management function 310 includes an alert table 311 which manages information of an alert ID and an alert level and an alert reception unit 312 which receives an alert which is transmitted by a server.

FIG. 4 illustrates the policy table 302 which is owned by the administration server 106. In the policy table 302, policies defined by a user are managed, and each policy includes a policy identifier 401; a description of policy 402; acquisition of snapshot 403 which defines whether or not a snapshot is to be acquired; automatic switching to backup server 404 which defines whether switching from an active server to a backup server should be performed or not; and a to-be-used disk 405 which indicates which disk should be used when switching is made to a backup server. The description of policy 402 includes those to be applied at the time of: logging on; starting up of the OS; regular time; after the elapse of a certain operation time; within CPU load; exceeding the update rate of snapshot by a certain rate; frequent cautions and warnings; exceeding a certain numbers of cautions and warnings; occurrence of a failure; request by a user, etc. The to-be-used disk 405 includes items similar to the description of policy 402, and the generation and date of acquisition may be specified in addition to descriptions. For business work that constantly uses latest information and thus is not permitted to stop, a policy to acquire a snapshot at regular times and a policy to reboot the server by using a snapshot that is acquired at regular times, when a failure occurs can be used. On the other hand, for business work for which resumption of the work is only required, a policy to acquire a snapshot when starting up the OS and a policy to reboot the server with the snapshot acquired at the time of OS startup, when a failure occurs can be used. It is also possible to initiate restarting under the status existed right before the failure occurrence by acquiring a snapshot when cautions and warnings occur frequently and by restarting the server with the snapshot acquired before cautions and warnings occurred frequently, when a failure occurs.

FIG. 5 shows a disk management table owned by the administration server 106. The disk management table 303 manages information of a disk on which snapshots are stored, and for each disk it includes an LU 501; a snapshot 502 which is a snapshot name; an acquisition source LU 503 which shows from which LU a snapshot is acquired; a type 504 which shows for what alert a snapshot is acquired; generation 505 which is used to discriminate snapshots when the same type of snapshots are created from the same server; and an acquisition date 506 of a snapshot.

FIG. 6 shows a server management table owned by the administration server 106. A server management table 308 manages information of active or backup servers, and for each server it includes a server identifier 601, a WWN 602, an LU 603, a backup server 604, operational duration 605, an operation rate 606 and an introduction date 607. Here, operation duration 605 means total time when a server is turned on, the operation rate 606 means a value obtained by dividing average failure time with the sum of the average failure time and average recovery time, and the introduction date 607 means the date when a server is purchased and introduced into the system.

FIG. 7 shows an alert table owned by the administration server 106. The alert table 311 manages alert IDs and alert levels and, for each alert, it includes an alert ID 701 and an alert level 702. An alert contains several types and levels such as log off and excess of the CPU load by a certain extent, in addition to information, caution, warning, failure, OS startup and shutdown, and handling methods to be described on the policy table 302 vary according to the alert level 702.

Figure 8:
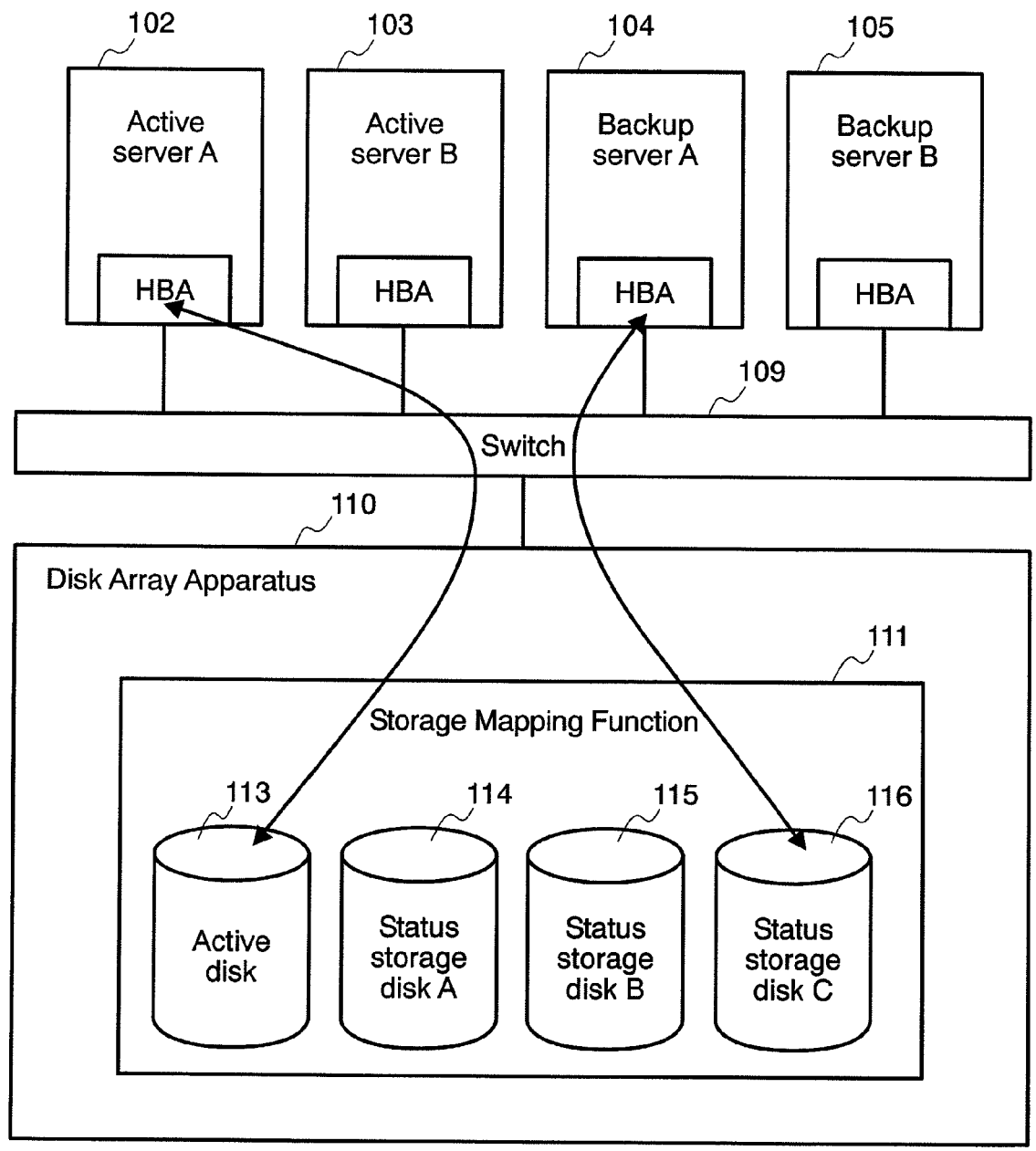
FIG. 8 is a conceptual diagram illustrating a storage mapping function of the above-stated embodiment.

FIG. 8 shows a conceptual diagram in which the servers 102, 103, 104 and 105 and the disk array apparatus 110 are mapped by the switch 109. The storage mapping function 111 owned by the disk array apparatus 110 is a function that enables flexible association between the disks 113 to 116 in the disk array apparatus 110 and the servers 102 to 105. For example, the active server A102 and the backup server A104 are connected to the active disk 113 and the status storage disk C116, respectively, and enable to boot the OS through the storage mapping function 111 of the disk array apparatus 110. As stated above, since the association between the servers 102 to 105 and the disks 113 to 116 can be established flexibly, it is possible to flexibly control booting of the OS which is stored in the servers 102 to 105 and the disks 113 to 116.

Figure 9:
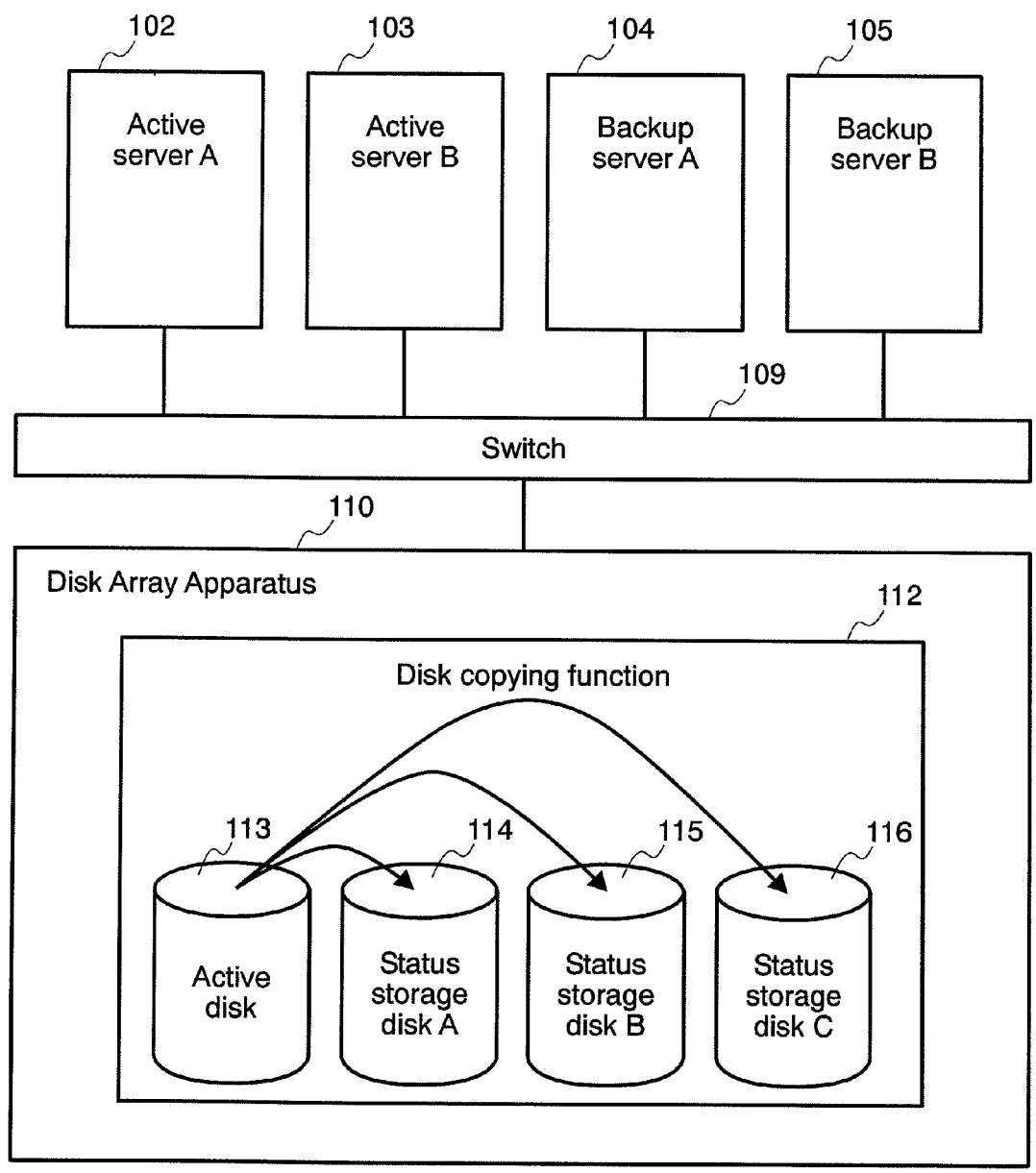
FIG. 9 is a conceptual diagram illustrating a disk copying function of the above-stated embodiment.

FIG. 9 shows a conceptual diagram illustrating how the active disk 113 is copied on a status storage disk. The disk copying function 112 owned by the disk array apparatus 110 is a function in which copying among the disks 113, 114, 115 and 116 in the disk array apparatus 110 can be performed without using the servers 102, 103, 104 and 105. In general, to copy a disk, a server reads data of a copy source disk and writes the data on a copy destination disk. On the other hand, with the disk copying function, copying can be performed within a disk array apparatus instead of using a server. Since copying can be performed within the disk array apparatus 110, high-speed disk copying can be realized. The active disk 113 is copied by the disk copying function 112 on to the status storage disk A114, B115 or C116. In addition, the term "remote copying" means a function to copy a disk of a disk array apparatus on a disk of a different disk array apparatus. If the remote copying function is used, then the copy destination is not limited to the disk array apparatus in which the active disk 113 is incorporated, but it may be a different disk array apparatus that is located at a remote place.

Figure 10:
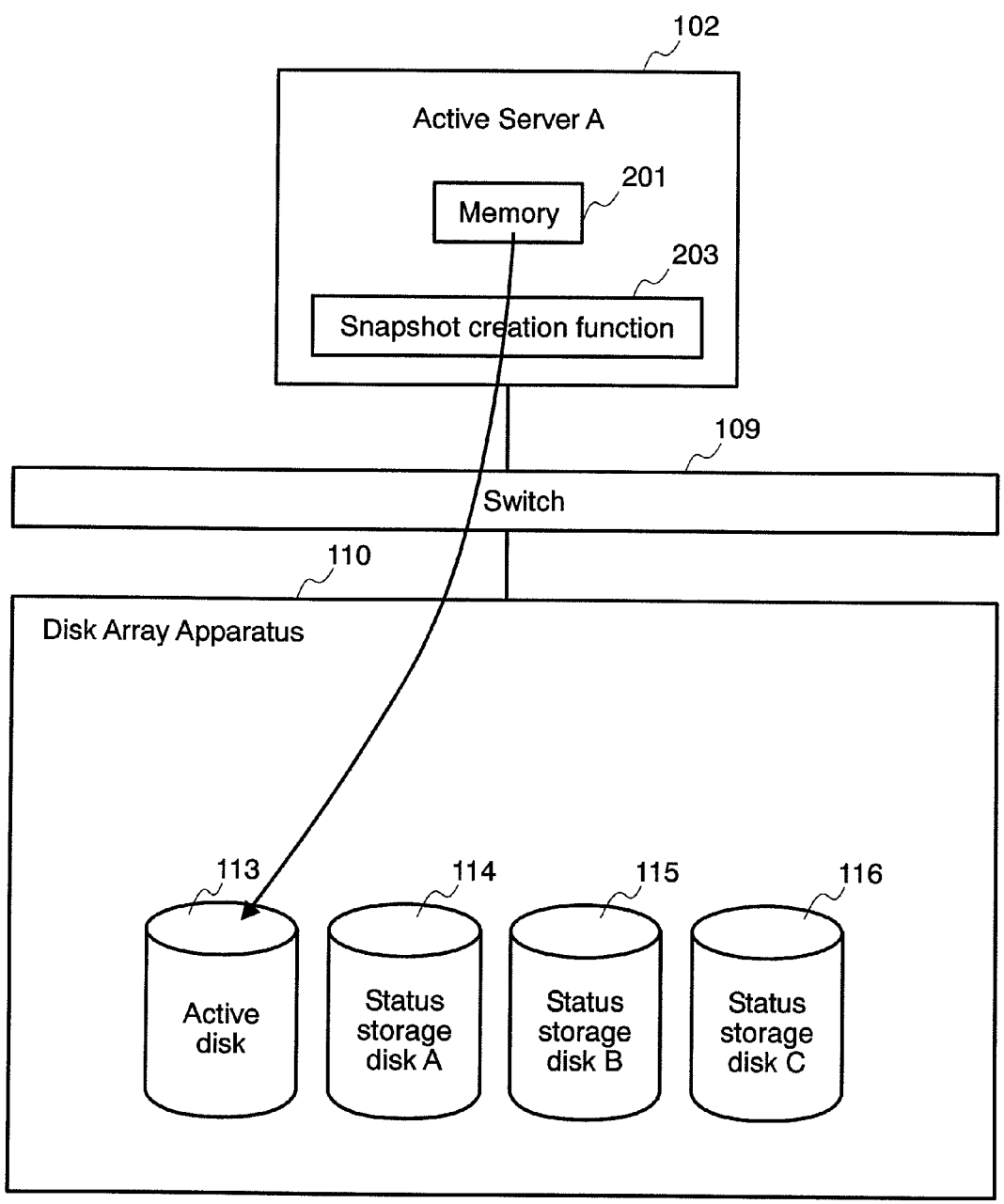
FIG. 10 is a conceptual diagram illustrating a snapshot creation function of the above-stated embodiment.

FIG. 10 shows a conceptual diagram for creating a snapshot of the active server A102. The active server A102 stores a snapshot of a memory 201 on the active disk 113 by using a snapshot creation function 203. When the snapshot is read to the active server A102, information that was available at the time of acquiring the snapshot is expanded in the memory 201, which enables to start up the active server 102A at high-speed.

Figure 11:
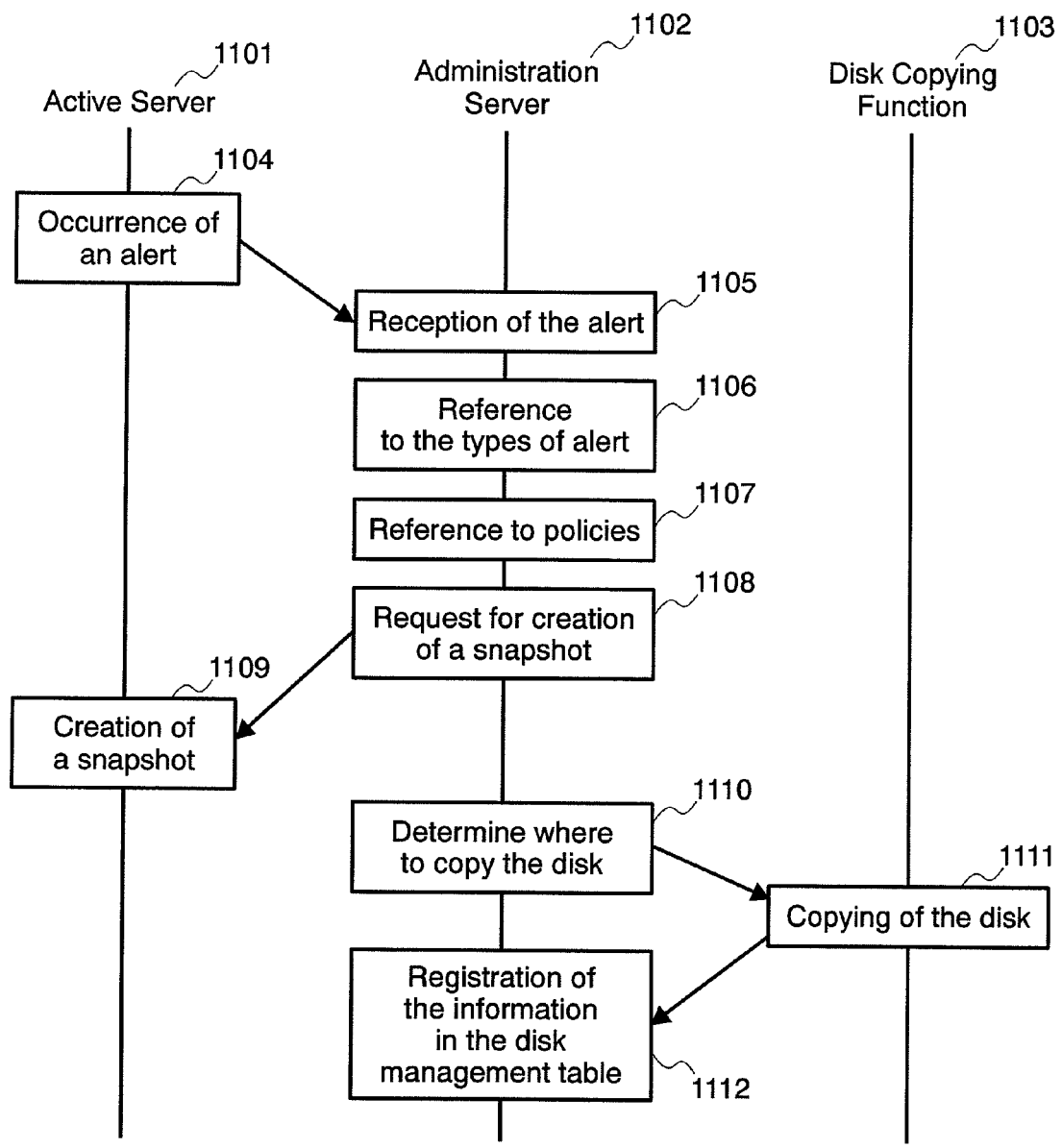
FIG. 11 is a sequence diagram illustrating snapshot creation and disk copying of the above-stated embodiment.

FIG. 11 shows a sequence to execute creation of a snapshot and disk copying, as being triggered by occurrence of an alert in an active server. In an active server 1101, when an alarm occurs in Step 1104, an administration server 1102 receives the alert in Step 1105. In Step 1106, the administration server 1102 refers to a type of alert on the alert table 311 and, in Step 1107, it refers to policies on the policy table 302 based on the type of the alert. In Step 1108, according to the policy the administration server 1102 issues a request to the snapshot execution unit 305 for creating a snap shot. The active server 1101 creates a snapshot by using the snapshot creation function 203 in Step 1109. The administration server 1102, upon completing creation of a snapshot in Step 1109, searches the disk management table 303 for a disk copy destination in which the snapshot is stored in Step 1110 and requests the disk copying function 1103 via the disk copy execution unit 306 to copy the disk. In Step 1111, the disk copying function 1103 copy the active disk on a status storage disk by using the disk copying function 112, and the administration server 1102 registers information of the snapshot in the disk management table 303 in Step 1112.

Figure 12:
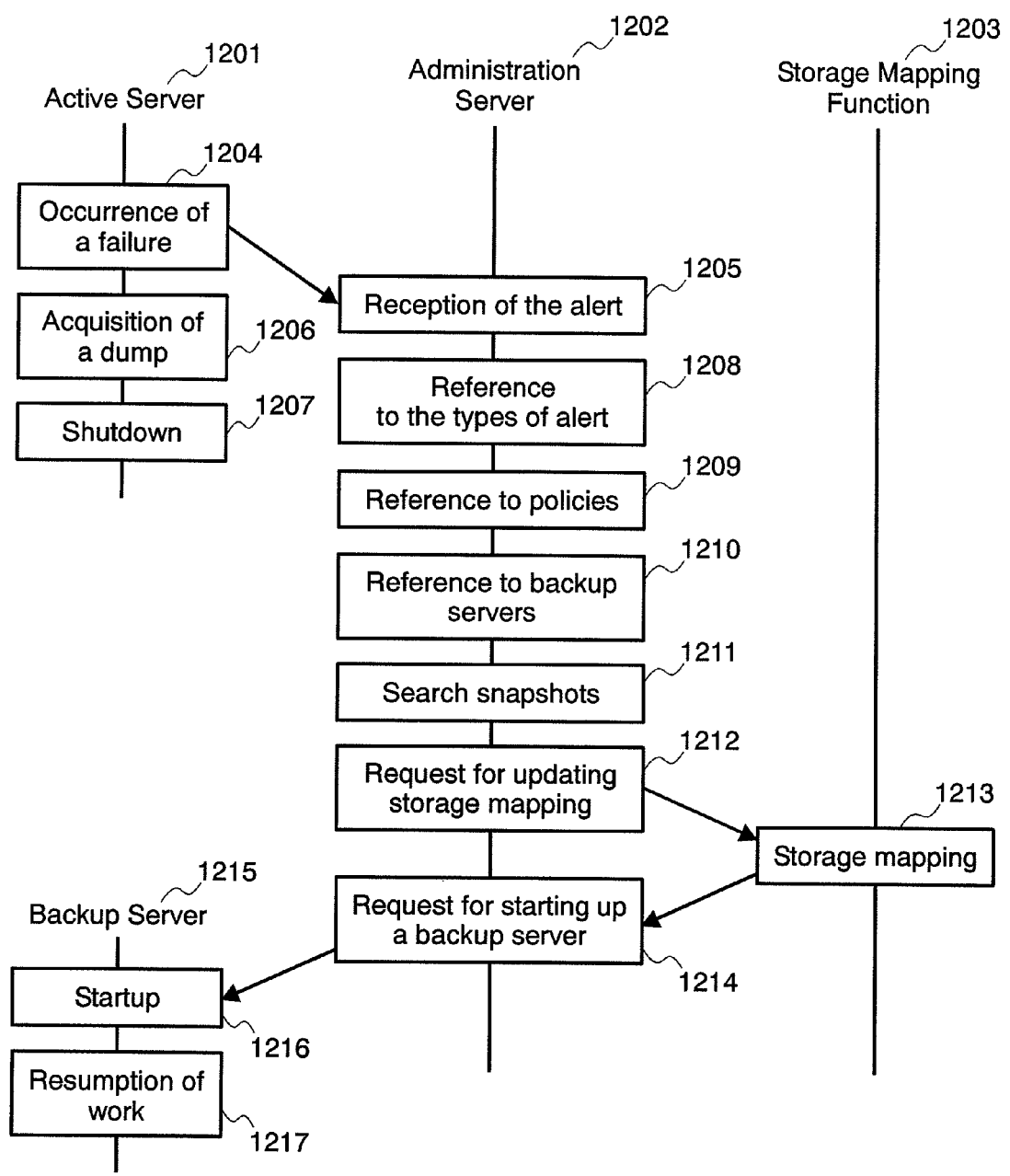
FIG. 12 is a sequence diagram illustrating update in storage mapping and starting up from a snapshot of the above-stated embodiment.

FIG. 12 shows a sequence diagram illustrating how a backup server restarts business work using a snap shot in response to the occurrence of a failure alert at an active server. In an active server 1206, upon occurrence of a failure alert in Step 1204, the active server 1201 acquires a dump in Step 1206 and shuts itself down in Step 1207. On the other hand, an administration server 1202 receives the failure alert in Step 1205, refers to types of alert in the alert table 311 in Step 1208, and, in Step 209, it also refers to policies in the policy table 302 based on the type of the alert. In Step 1210, the administration server 1202 chooses a backup server associated with the active server in the server management table 308, and searches the disk management table 303 for a disk of the snapshot to be used for the backup server according to an LU 603 of the server management table 308 and the to-be-used disk 405 of the policy table 302. Here, for choice of the backup server, it can be acquired from the field of backup server 604 in the server management table 380. However, operational duration 605, operation rate 606, introduction date 607, etc. may also be used. In Step 1212, the administration server 1202 issues a request for updating storage mapping via the storage mapping update unit 309, and the storage mapping function 1203 updates mapping of storage in Step 1213. The administration server 1202, after the update of storage mapping, issues a request for startup to a backup server in Step 1214, and the storage server 1215 starts up in Step 1215 and resumes business work in Step 1217. Alternatively, in Step 1210, the administration server 1202 chooses one more backup server in addition to the backup server for resuming business work and searches for a snapshot created at the time of occurrence of the failure in Step 1211. Then, after the storage mapping in Step 1213, the administration server 1202 can prepare another server for analyzing failure in addition to the server for resuming business work. The server for analyzing failure can also be booted through the stepwise execution. Here, the term "stepwise execution" means that operation is carried out by using a debug mode.

Figure 13:
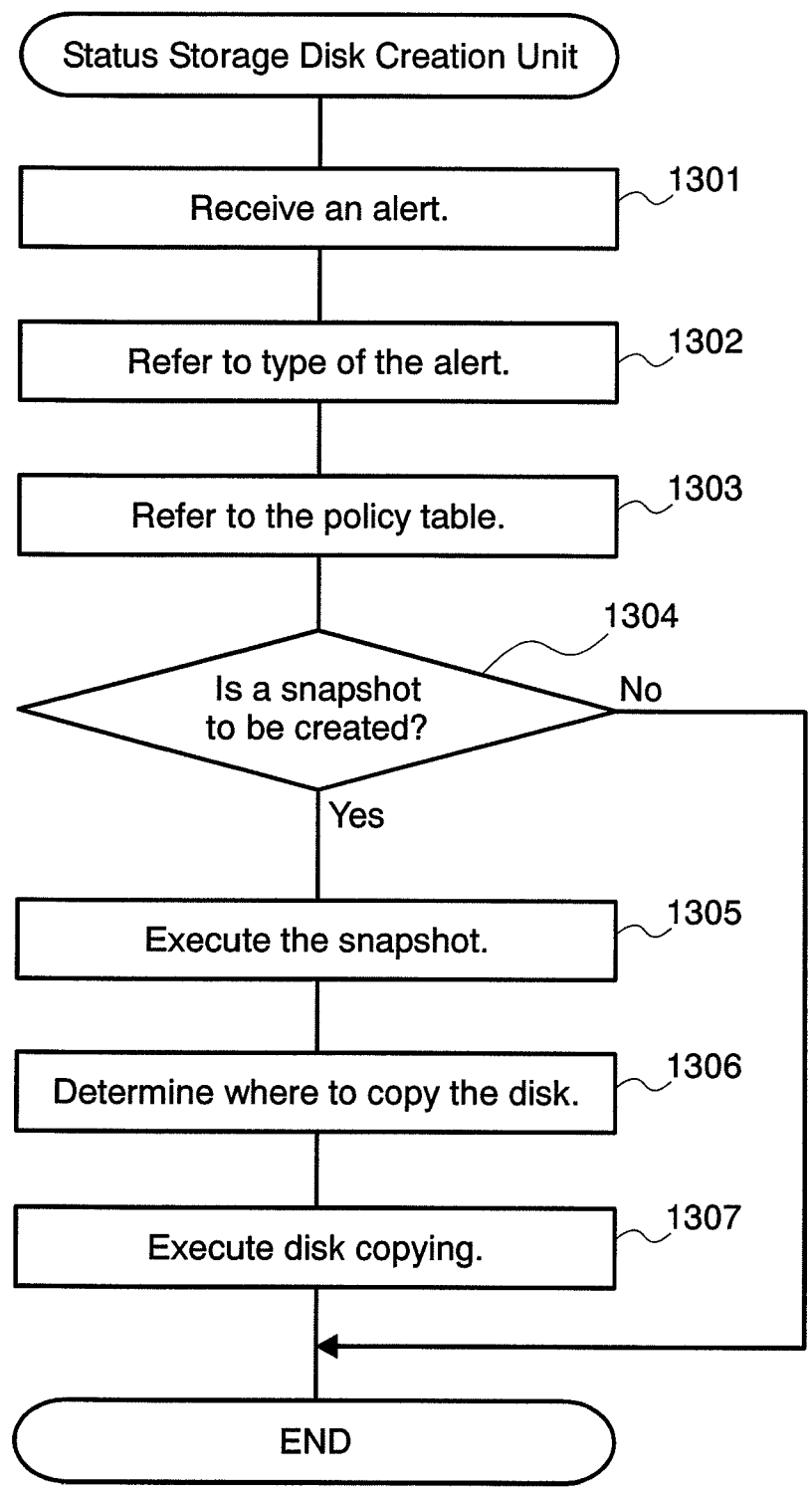
FIG. 13 is a flow chart illustrating a status storage disk creation unit of the above-stated embodiment.

FIG. 13 is a flow chart illustrating snapshot creation and disk copying processes to be executed in the status storage disk creation unit 304. The status storage disk creation unit 304, upon receiving an alert in Step 1301, refers to types of alert in Step 1302. In Step 1303, the unit 304 refers to a policy according to the type of alert, and if a snapshot is to be created in accordance with the policy in Step 1304, the unit 304 advances the process to Step 1305. If a snapshot is not required, the unit 304 terminates the process. In Step 1305, the status storage disk creation unit 304 executes the snapshot and determines where to copy the disk in Step 1306. The unit 304 executes disk copying in Step 1307. As a result, the LU 501 which contains the description of policy 402, as the type 504, which was referred to in the policy table 302, is added to the disk management table 303. By cross-checking the alert from a server with the policy table 302 and referring to policies in Step 1303, it becomes possible to create snapshots for various conditions according to types or levels of importance of business work, thus enabling flexible dealing with user requirements. Further, when only the latest snapshot is required to be kept, by designating the generation to be acquired as the first generation in the description of policy 402 in the policy table 302, the snapshot can be overwritten and saved in the same LU 501 in the disk management table 303. On the other hand, when previous snapshots are also required to be kept, by designating the generation to be acquired as the third generation in the description of policy 402 in the policy table 302, the snapshots can be saved in sequence in the three LUs 501 in the disk management table 303. With such arrangement, it is possible to restrict the number or volume of snapshots.

Figure 14:
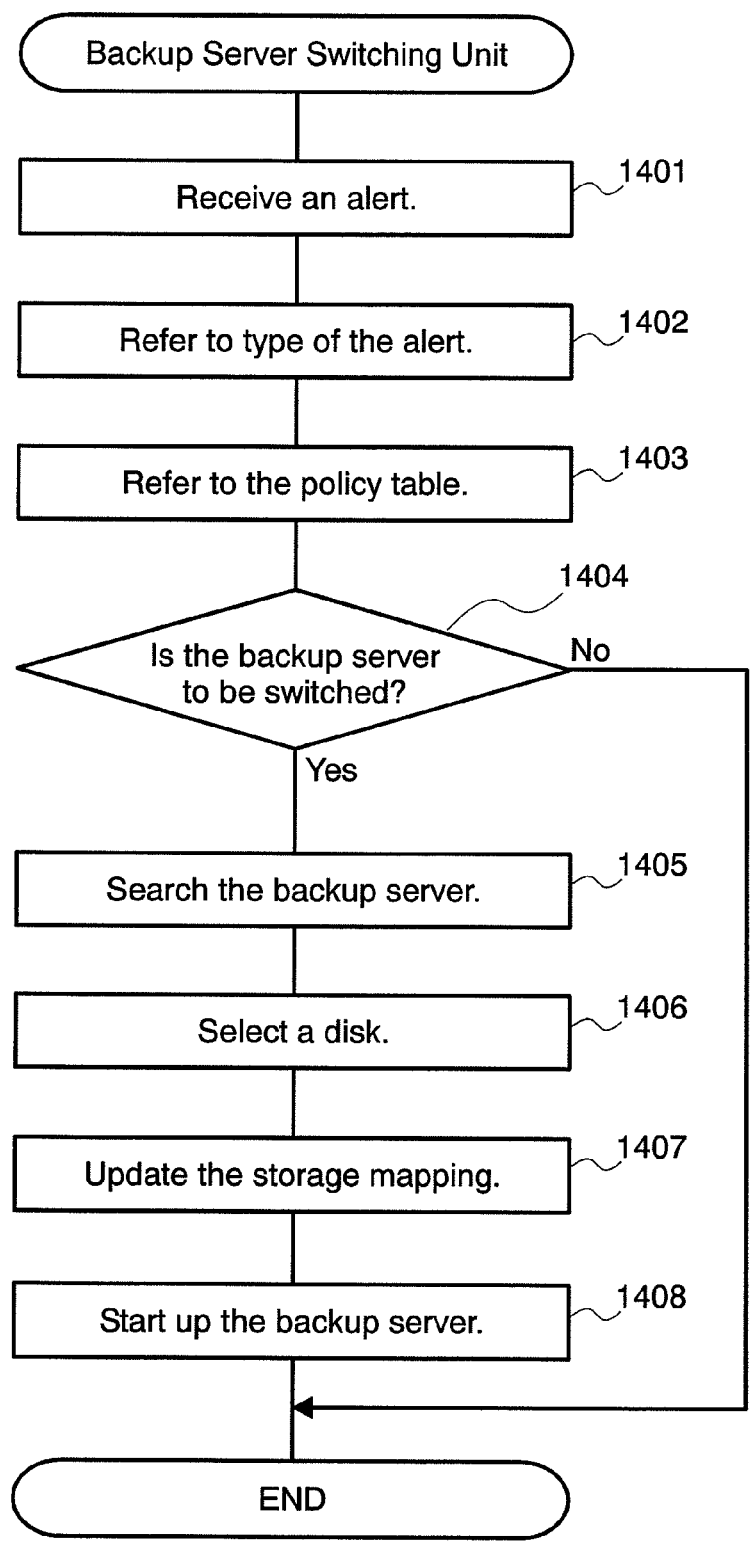
FIG. 14 is a flow chart illustrating a backup server switching unit of the above-stated embodiment.

FIG. 14 is a flow chart illustrating processes to search a backup server and update storage mapping in the backup server switching unit 307. The backup server switching unit 307, upon receiving an alert in Step 1401, refers to the types of alert in Step 1402. In Step 1403, the unit 307 refers to a policy according to the type of alert, and if the server is to be switched over to a backup server in accordance with the policy in Step 1404, the unit 307 advances the process to Step 1405. If the switching is not required, it terminates the process. In Step 1405, the backup server switching unit 307 searches backup servers and, in Step 1406, the unit 307 chooses the LU 501 in the disk management table 303, as a disk to be started up with the backup server, which has the disk to be used 405 in the policy table 302 as the type 504 among LUs that were used by the active server. Other examples of methods for choosing a disk include: in addition to the method stated above, a method for choosing the LU 501 at around the specified time by using the date of acquisition 506; a method for choosing the latest LU 501 irrespective of the type 504; and a method for choosing the LU 501 that existed right before the occurrence of a failure. In Step 1407, the backup server switching unit 307 updates storage mapping and, in Step 1408, it stats up a backup server. By cross-checking the alert from a server with the policy table 302 and referring to policies in Step 1403, it becomes possible to switch the server to a backup server under various conditions according to types or levels of importance of business work, thus enabling to flexibly deal with user requirements. When the latest business work is required to be taken over with the backup server, by designating the field of the to-be-used disk 405 in the policy table 302 as the latest disk, it is possible, when necessity of switching occurs, to start up the server by using the latest LU 501 based on the acquisition date 506 in the disk management table 303, thus enabling resumption of business work while taking over the data that existed right before the switching. When business-related important work occurs at 17:00 every day, by designating 18:00 on the field of the to-be-used disk 405 in the policy table 302, it is possible to initiate startup by using the LU 501 designated at 18:00 from the acquisition date 506 in the disk management table 303 when necessity of switching occurs, thus enabling resumption of business work while taking over the data available after the end of the important work.

According to the first embodiment, it becomes possible, in accordance with the policy created by a user, to create snapshot for various conditions, and to choose a snapshot when the active server is switched to a backup server, thus enabling flexible high-speed booting by using the snapshot.

Second Embodiment

Figure 15:
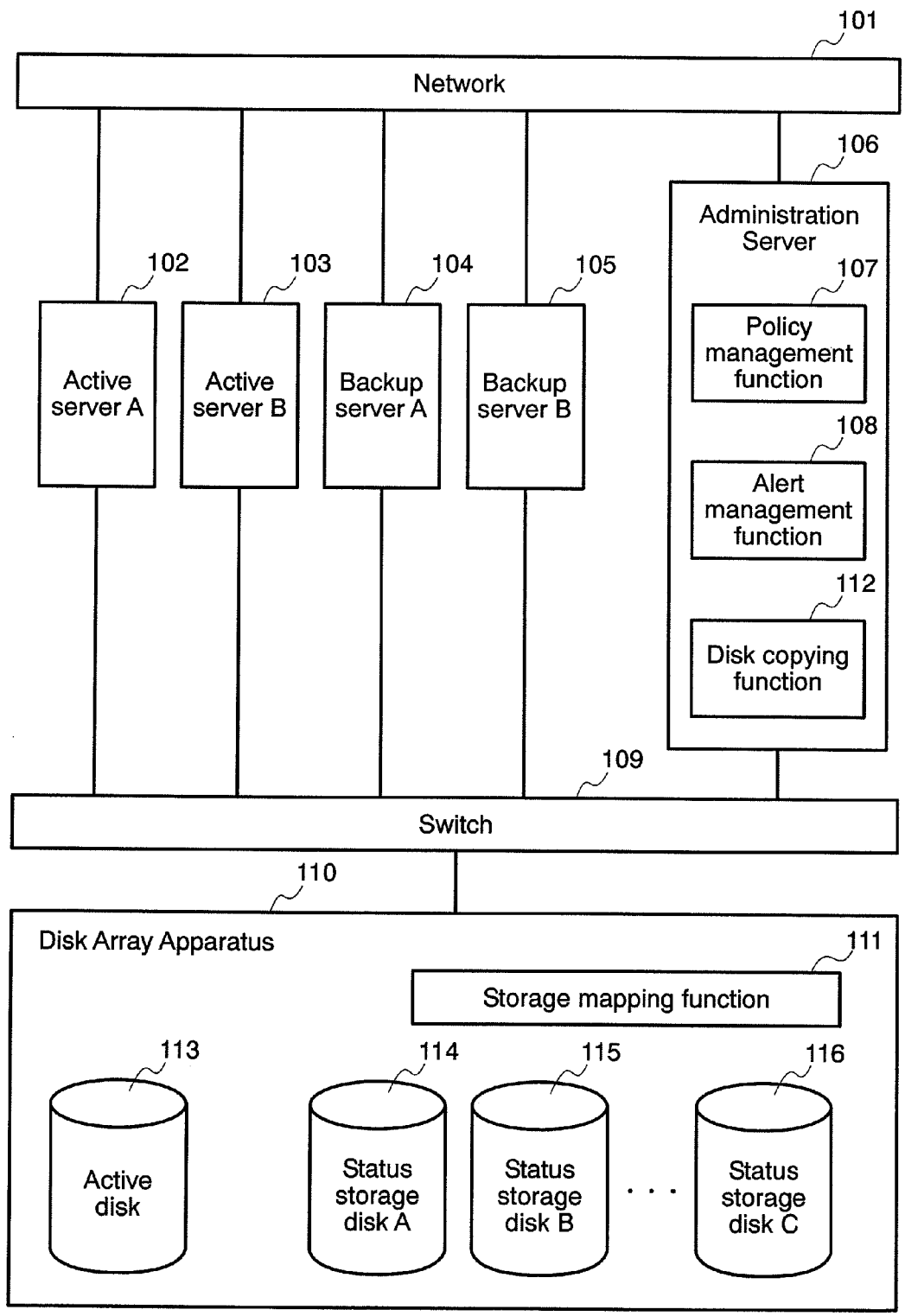
FIG. 15 is a block diagram illustrating the entire configuration of a second embodiment of the present invention.

FIG. 15 is a configuration example of a system according to a second embodiment according to the present invention. The second embodiment differs from the first embodiment in that the disk copying function 112 that has been included in the disk array apparatus 110 is included in an administration server 106. The disk copying function 112 included in the administration server 108 copies an active disk 113 on status storage disks A114, B115 and C116.

Figure 16:
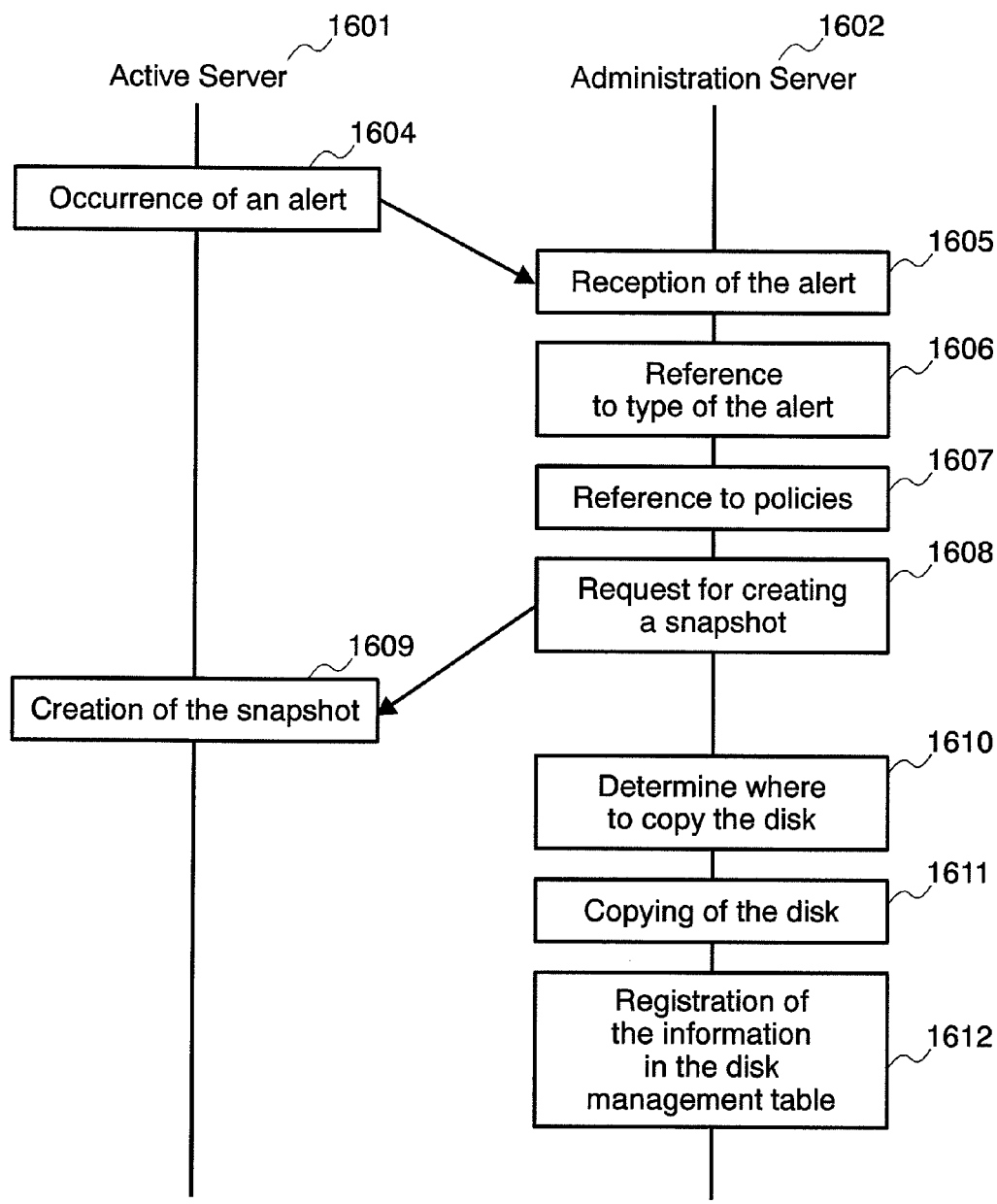
FIG. 16 is a sequence diagram illustrating snapshot creation and disk copying of the embodiment of present invention.

FIG. 16 is a sequence diagram illustrating processes, in the second embodiment, to create a snapshot and copy a disk, as being triggered by occurrence of an alert in an active server. In an active server 1601, when an alert occurs in Step 1604, an administration server 1602 receives the alert in Step 1605. In Step 1606, the server 1602 refers to the types of alert in the alert table 311 and, in Step 1607, the server 1602 refers to policies in the policy table 302 based on the type of the alert. The administration server 1602 issues a request for crating the snapshot 203 through the snapshot execution unit 305, and the active server 1601 creates a snapshot by using the snapshot creation function 203 in Step 1609. The administration server 1602, upon completion of creation of the snapshot in Step 1609, searches, in the disk management table 303, the copy destination disk in which the snapshot is to be saved, copies the active disk on the status storage disk by using the disk copying function 112 and registers information of the snapshot in the disk management table 303 in Step 1612.

According to the second embodiment, even if only the disk array apparatus 110 that does not include the disk copying function 112 is available, it is possible to obtain the same effect as that of the first embodiment by allowing the administration server 106 to read data of the copy source disk and write the data on the copy destination disk.

Third Embodiment

Figure 17:
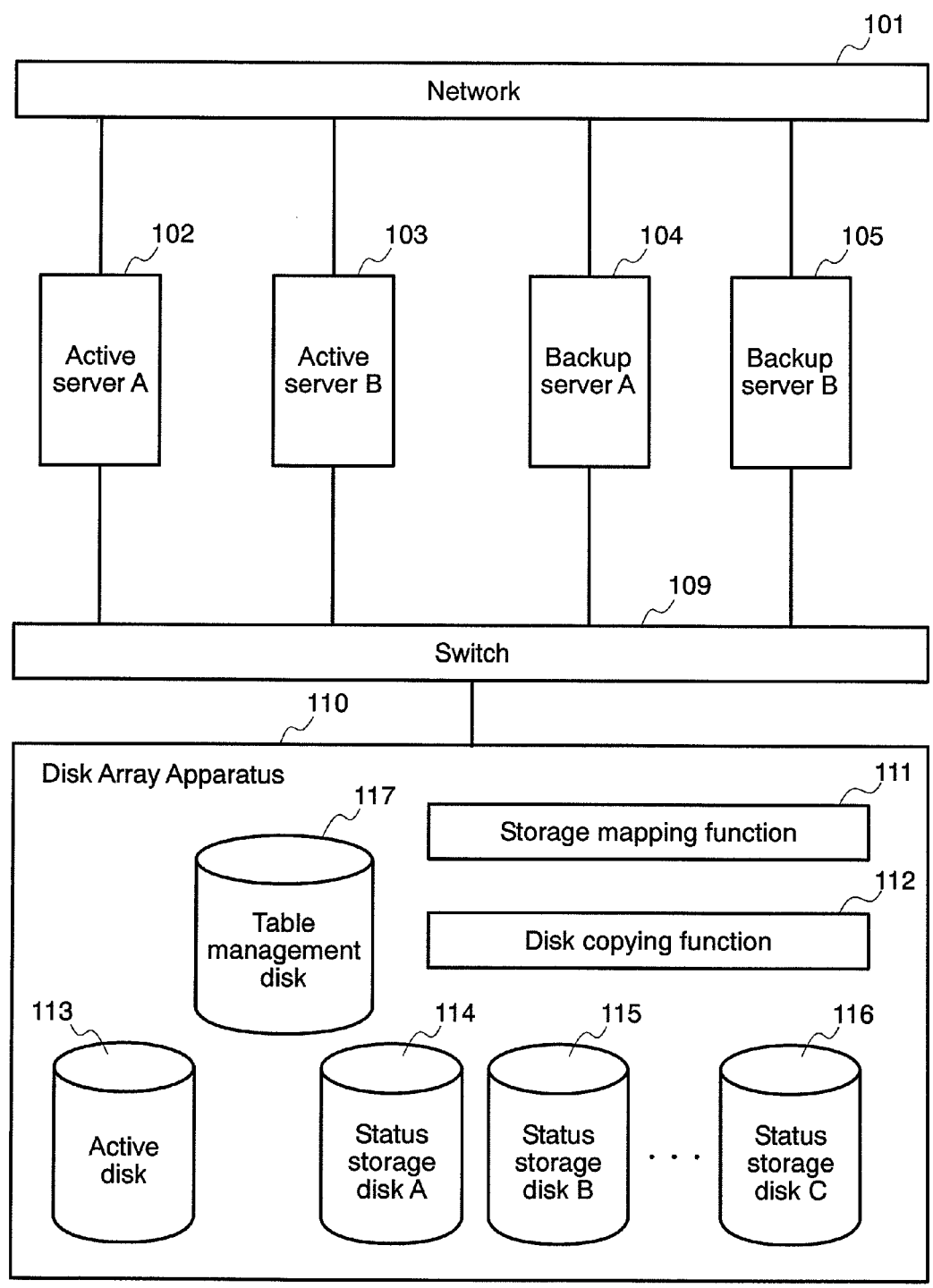
FIG. 17 is a block diagram illustrating the entire configuration of a third embodiment of the present invention.

FIG. 17 shows a configuration example of a system according to a third embodiment of the present invention. The third embodiment differs from the first embodiment in that the third embodiment does not have the administration server 106 and a table management disk 117 includes the policy table 302, disk management table 303, server management table 308 and alert table 311 which were included in the administration server 106.

Figure 18:
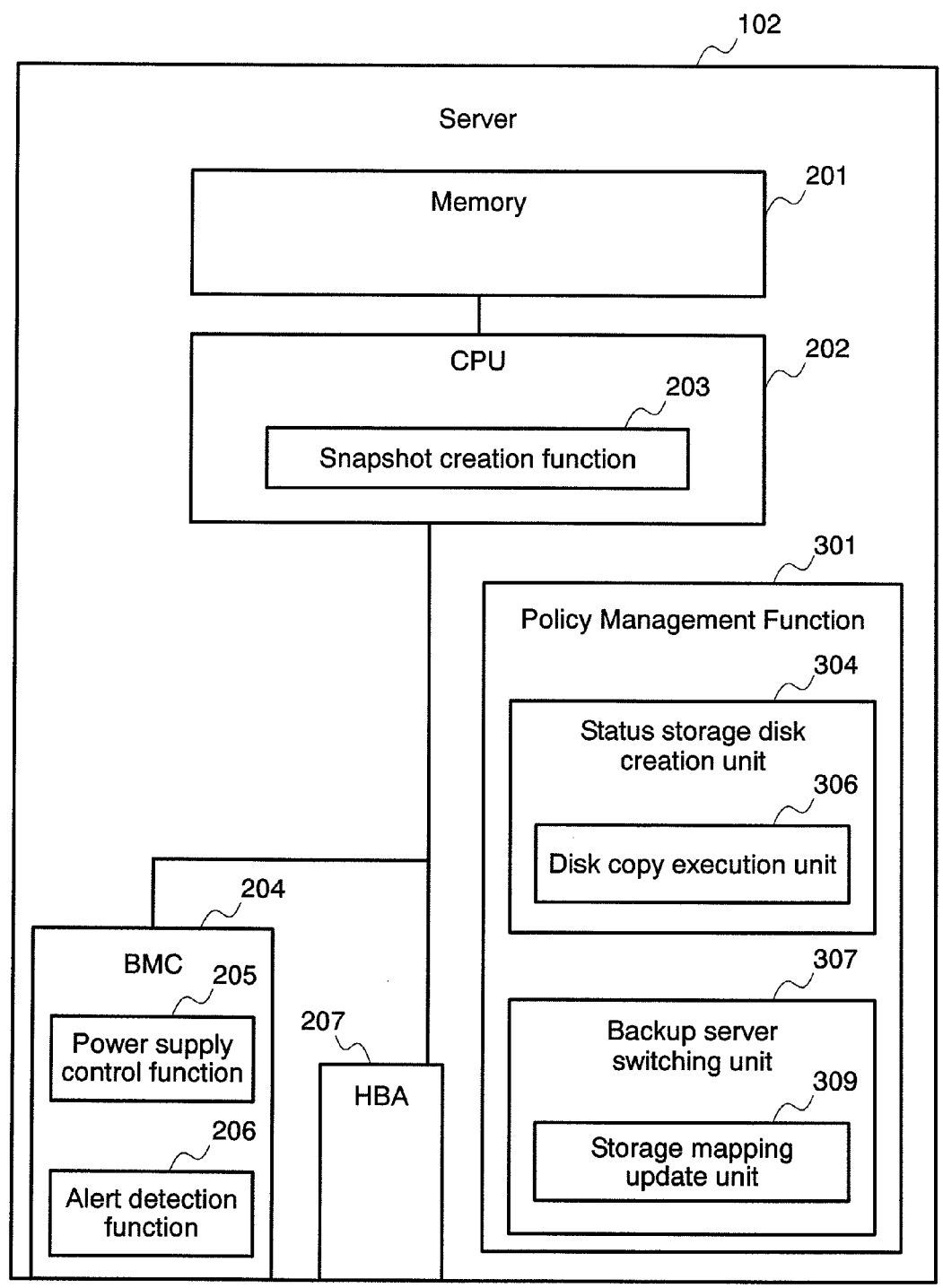
FIG. 18 is a block diagram illustrating a configuration of an administration server of the above embodiment of the present invention.

FIG. 18 is a block diagram of a server according to the third embodiment. The third embodiment differs from the first embodiment in that a server 102 includes the policy management function 301 that was included in the administration server 106. The server 102, upon detecting an alert, creates a snapshot by using the snapshot creation function 203 according to the policy in the table management disk 117 and copies a disk in the disk copy execution unit 306. Upon detection of a failure alert, the server 102 chooses a backup server and a disk according to the policy in the table management disk 117 and switches the server to a backup server through the storage mapping update unit 309.

According to the third embodiment, even if the administration server 106 is not available separately, servers 102, 103, 104 and 105 can execute creation of a snapshot or storage mapping while referring to the table management disk 117, thus offering the same effect as that of the first embodiment.

Fourth Embodiment

Figure 19:
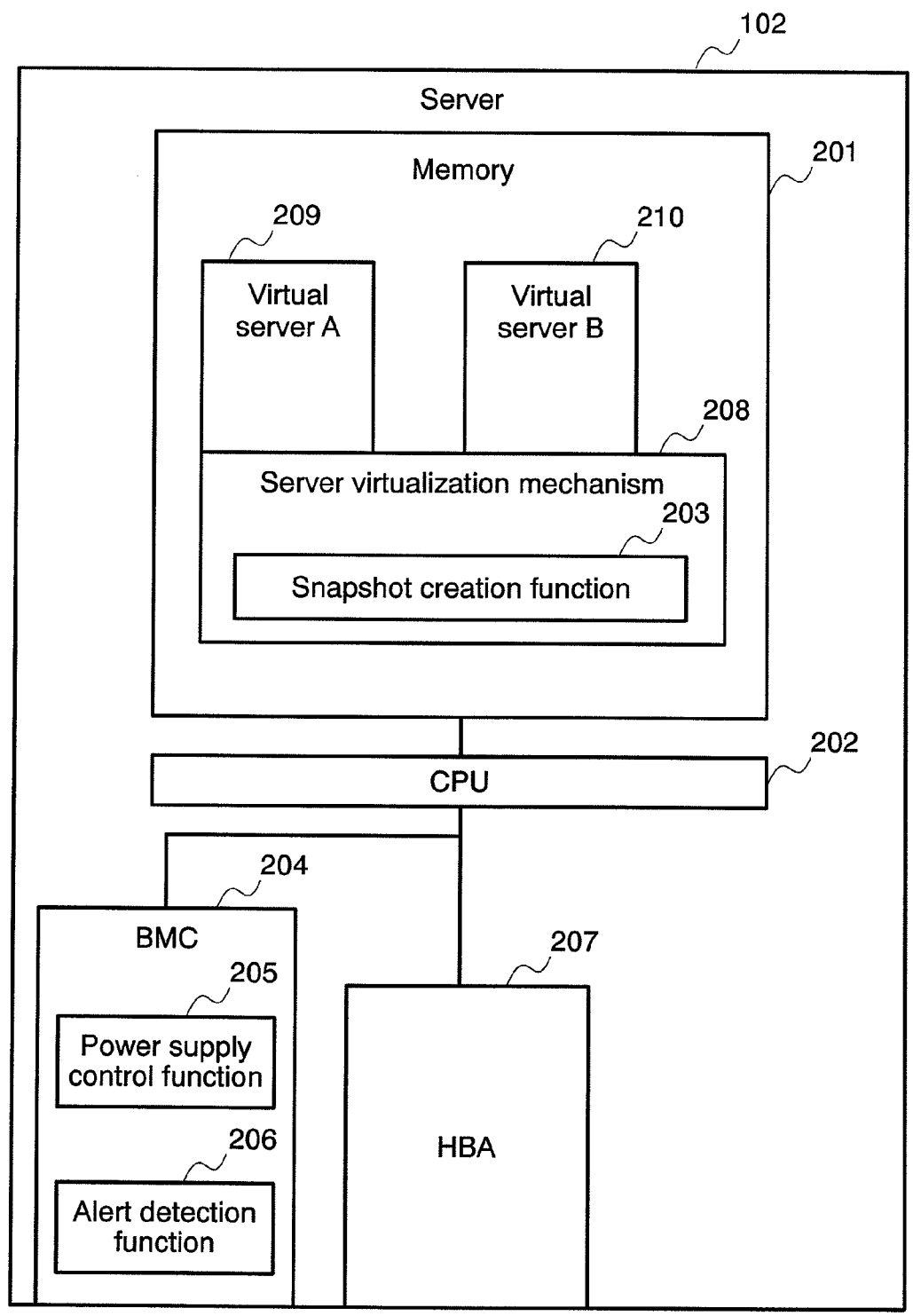
FIG. 19 is a block diagram illustrating a configuration of a server of a fourth embodiment of the present invention.

FIG. 19 shows a configuration example of a system according to the fourth embodiment of the present invention. The fourth embodiment differs from the first embodiment in that a memory 201 of a server 102 includes a virtual server A 209, a virtual server B 210, a server virtualization mechanism 208 which manages the virtual server A 209 and B 210, and a snapshot creation function to create a snapshot of the virtual servers. The snapshots of the virtual servers A 209 and B 210 can also be saved as is the case with the first embodiment.

According to the fourth embodiment, even if a sever is a virtual server, not a physical server, then high-speed restarting of the virtual servers A 209 and B 210 can be possible by using the snapshots, thus offering the same effect as that of the first embodiment.

Even in a case where a failure occurs in a server in service or a disk and its booting is conducted by switching the server to a backup server by using a snapshot to take over business work, a backup server, a snapshot which is in the normal status and a disk that conform to the user policy can be chosen for use among the history of snapshots that had been acquired previously in various statuses, thus enabling to offer a system that can activate the failover function.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A server restarting method for a computing system comprising:
    a plurality of active servers connected to a disk device comprising a plurality of storage areas;
    at least one backup server connected to said disk device; and
    an administration server to which each of said active servers and said backup server are connected, said administration server storing a snapshot containing memory content of said each active server in said storage areas,
    the method comprising said administration server performing steps of:
        receiving an alert from a first active server;
        determining whether said alert corresponds to a predetermined condition;
        issuing an instruction to said first active server to obtain an additional snapshot in addition to a previous snapshot obtained by said first active server when it is determined that said alert corresponds to said predetermined condition;
        storing said additional snapshot in a storage area different from a storage area that stores said previous snapshot; and
        storing information in a disk management storage area that relates together said additional snapshot, said storage area that stores said additional snapshot, and said predetermined condition,
        wherein when a failure occurs in one of said active servers, designated a failed active server, then:
            extracting a plurality of storage areas in which a snapshot corresponding to said failed active server is stored based on said information in said disk management storage area;
            selecting a storage area corresponding to said predetermined condition from among said extracted storage areas using said information in said disk management storage area; and
            starting up said backup server.

2. The method according to claim 1, wherein the timing for acquiring said snapshot includes timing of shutting down the OS of said failed active server after the OS of said backup server is booted.

3. The method according to claim 1, wherein, when a failure occurs in said failed active server, then the storage area connected therewith is connected with another backup server that is different from the backup server to be started and is then started.

4. The method according to claim 3, wherein, when a failure occurs in said failed active server, the failed active server acquires a memory dump, and then switches the storage area which acquired said memory dump over to a backup server.

5. The method according to claim 1, wherein each of said active servers includes policy storage means in which timing of a snapshot to be restarted when a failure occurs is stored; and
    wherein said policy storage means is referred to when said failed active server fails, and
    a storage area in which timing of a snapshot associated with said failed active server and timing stored in said disk management storage area coincide with each other is chosen and connected to the backup server.

6. The method according to claim 5, wherein said policy storage means retains timing of acquiring said snapshot, determines whether or not an alert issued from the failed active server and said timing of acquiring the snapshot coincide with each other, and if the alert issued from the failed active server and said timing of acquiring the snapshot coincide with each other, acquires a snapshot for the failed active server.

7. The method according to claim 1, wherein said disk device includes a function to copy a storage area, and after acquiring said snapshot, uses said copying function to create a copy of the storage area for which said snapshot was acquired, and adds information of the copy of the storage area to said disk management storage area.

8. The method according to claim 1, wherein, said snapshot is acquired as a snapshot of a virtual server that operates on said failed active server.

9. The method according to claim 1, wherein said failed active server and said backup server are connected to a plurality of disk devices each of which is provided with a plurality of storage areas, and said disk device copies the storage area to a storage area of a different disk device.

10. The method according to claim 9, wherein said disk device copies a storage area in which a snapshot of said failed active server is stored to a storage area of a disk device to which a backup server is connected, and when said failed active server fails, said disk device connects the storage area that was connected to the failed active server, and starts up the storage area.

11. The method according to claim 9, wherein each of said active servers includes policy storage means in which timing of a snapshot to be restarted when a failure occurs is stored; and
    wherein said policy storage means is referred to when said failed active server fails, and
    a storage area in which timing of a snapshot associated with said failed active server and timing stored in said disk management storage means coincide with each other is chosen, and
    the chosen storage area is connected to a backup server.

12. The method according to claim 11, wherein said policy storage means retains timing of acquiring said snapshot, determines whether or not an alert issued from the failed active server and said timing of acquiring the snapshot coincide with each other, and if the alert issued from the failed active server and said timing of acquiring the snapshot coincide with each other, acquires a snapshot for the failed active server.

13. The method according to claim 9, wherein said snapshot is acquired as a snapshot of a virtual server that operates on said failed active server.

14. A computing system comprising:
    a plurality of active servers connected to a disk device comprising a plurality of storage areas;
    at least one backup server connected to the disk device; and
    an administration server to which each of said active servers and said backup server are connected, said administration server storing a snapshot containing memory content of said each active server in said storage areas,
    each active server configured to store a snapshot containing memory content of said each active server in said storage areas,
    said administration server configured to:
        receive an alert from a first active server;
        determine whether said alert corresponds to a predetermined condition;
        issue an instruction to said first active server to obtain an additional snapshot in addition to a previous snapshot obtained by said first active server when it is determined that said alert corresponds to said predetermined condition;

store said additional snapshot in a storage area different from a storage area that stores said previous snapshot; and store information in a disk management storage area that relates together said additional snapshot, said storage area that stores said additional snapshot, and said predetermined condition, wherein when a failure occurs in one of said active servers, designated a failed active server, then:

extract a plurality of storage areas in which a snapshot corresponding to said failed active server is stored based on said information in said disk management storage area;

select a storage area corresponding to said predetermined condition from among said extracted storage areas using said information in said disk management storage area; and start up said backup server.

15. A computing system according to claim 14, wherein, when a failure occurs in said active server, the storage area which was connected to said failed active server is connected to another backup server that is different from the backup server to be started and is then started.

16. A computing system according to claim 14, wherein said disk device includes:

means for copying a storage area; and means, after acquiring said snapshot, for using said copying means to create a copy of the copied storage area for which said snapshot was acquired, and adding information of the copied storage area to said disk management storage means.

17. A computing system according to claim 14, wherein said policy storage means retains timing of acquiring said snapshot, determines whether or not an alert issued from the active server and said timing of acquiring the snapshot coincide with each other, and if the alert issued from the active server and said timing of acquiring the snapshot coincide with each other, acquires a snapshot for the active server.

18. A computing system according to claim 14, wherein, an activate server includes means, when being in failure, for switching, after having acquired a dump, a storage area which acquired said dump over to a backup server.

* * * * *